(12) United States Patent
Jacobsen et al.

(10) Patent No.: US 8,671,758 B2
(45) Date of Patent: Mar. 18, 2014

(54) SYSTEM AND METHOD FOR MEASURING THE FREQUENCY OF A VIBRATING OBJECT

(75) Inventors: Larry Eugene Jacobsen, Nibley, UT (US); Scott Steven Cornelsen, Logan, UT (US)

(73) Assignee: Campbell Scientific, Inc., Logan, UT (US)

( * ) Notice: Subject to any disclaimer, the term of this patent is extended or adjusted under 35 U.S.C. 154(b) by 242 days.

(21) Appl. No.: 13/299,077

(22) Filed: Nov. 17, 2011

(65) Prior Publication Data

US 2013/0125653 A1    May 23, 2013

(51) Int. Cl.
*G01N 29/12* (2006.01)
*G01N 29/46* (2006.01)

(52) U.S. Cl.
USPC .............................. 73/579; 73/659; 73/862.41

(58) Field of Classification Search
USPC ................. 73/579, 651, 778, 862.41
See application file for complete search history.

(56) References Cited

U.S. PATENT DOCUMENTS

| | | | |
|---|---|---|---|
| 3,889,525 A * | 6/1975 | Bailey | 73/579 |
| 5,397,983 A * | 3/1995 | Zabar et al. | 324/133 |
| 5,463,907 A * | 11/1995 | Herget et al. | 73/862.392 |
| 5,796,005 A * | 8/1998 | Frolow | 73/651 |
| 7,591,187 B2 * | 9/2009 | Hamel | 73/778 |
| 7,779,690 B2 | 8/2010 | Jacobsen et al. | |
| 2006/0254365 A1 | 11/2006 | Hamel | |
| 2012/0121059 A1 | 5/2012 | Kim | |

FOREIGN PATENT DOCUMENTS

| | | |
|---|---|---|
| KR | 10-0883394 B1 | 2/2009 |
| WO | 2011/007972 A2 | 1/2011 |

OTHER PUBLICATIONS

International Search Report dated Jan. 30, 2013 in Application No. PCT/US2012/064280.
Written Opinion of the International Searching Authority dated Jan. 30, 2013 in Application No. PCT/US2012/064280.

* cited by examiner

*Primary Examiner* — J M Saint Surin
(74) *Attorney, Agent, or Firm* — Maschoff Brennan (57) ABSTRACT

A system and method for measuring a frequency of a wire in a vibrating wire gauge. The system may include a signal generator for generating a signal at a frequency that matches a frequency of the wire vibration and an excitation unit for exciting the wire to increase an amplitude of the wire vibration. The excitation unit may excite the wire using the signal. The system may further include a signal gate for controlling when the signal is sent to the excitation unit.

21 Claims, 9 Drawing Sheets

SYSTEM AND METHOD FOR MEASURING THE FREQUENCY OF A VIBRATING OBJECT

BACKGROUND OF THE INVENTION

1. The Field of the Invention

The present invention generally relates to sensors. More particularly, embodiments of the invention relate to vibrating wire gauges.

2. The Relevant Technology

Vibrating wire gauges are widely used in a variety of applications, including measuring the magnitude of various properties and forces in many construction projects, including buildings, bridges, dams, piles, tunnel linings, pipelines, anchors, and others. The gauges have been adapted to monitor stress, strain, deflection, pressure, displacement, fluid level, angular motion, and temperature. Although advancing technology has produced other types of sensors, the vibrating wire gauge is often considered the best sensor for use in many settings, due to the sensor's long-term reliability.

The vibrating wire gauge generally operates on the vibrating wire principle which states that a wire vibrates at its resonant frequency when plucked. The resonant frequency is determined by $$v = \frac{n}{2l}\sqrt{\frac{\sigma}{\mu}}$$

where v is frequency in cycles/time, n is 1 cycle for the fundamental (non-harmonic) vibration mode, l is the length of the wire, σ is the wire tension (or stress) in force/area, and μ is the wire's length density in mass/length. The gauge may be constructed so that a wire is held in tension inside a small diameter, thin-walled tube that is welded or otherwise attached to a structural member. An electromagnetic coil may be used to pluck or excite the wire and measure the frequency of vibration. The frequency is then used to calculate any number of the structural member's physical properties, typically by applying a series of calibration factors.

In conventional systems, the wire is excited using a wide spectrum of frequencies and the wire's resonant frequency is measured. Before a second measurement may be taken, the wire is excited a second time after the wire is allowed or forced to stop vibrating. This time delay may be undesirable when multiple measurements of the vibrating wire need to be taken in succession.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

A system for measuring a frequency of a wire in a vibrating wire gauge is disclosed. The system may include a signal generator for generating a signal at a frequency that matches a frequency of the wire and an excitation unit for exciting the wire to increase an amplitude of the wire. The signal generator may control the amplitude of the signal and thereby control the amplitude of the wire. The excitation unit may excite the wire using the signal. The system may further include a signal gate for controlling when the signal is sent to the excitation unit. In some embodiments, the signal may be generated with a phase that matches the phase of the wire.

In some embodiments, the system may further include a frequency determinator for determining the frequency and the phase of the wire. In some embodiments, the system may further include a data controller for receiving and storing the frequency of the wire from the frequency determinator and directing the signal gate to send the signal to the excitation unit. The signal gate may send the signal to the excitation unit at any point during a cycle of the signal. The signal gate may also control the number of cycles of the signal sent to the excitation unit to thereby control the amplitude of the wire. Additionally, the signal gate may send the signal intermittently to the excitation unit but with enough recurrence to maintain a continual vibration of the wire.

In some embodiments, the system may further include a detection unit for detecting movement of the wire and sending detector signals to the frequency determinator. The signal gate may alternate between sending the detector signals to the frequency determinator and sending the signal to the excitation unit. Furthermore, the detection unit and the excitation unit may both comprise of a coil and may share the same coil.

An excitation system for measuring a frequency of a vibrating wire in a vibrating wire gauge is also disclosed. The system may include a signal generator for generating an excitation signal that matches a frequency and a phase of the vibrating wire and an excitation unit for exciting the vibrating wire while the wire is vibrating at any point during a cycle of the vibrating wire. The excitation unit may excite the vibrating wire using the excitation signal. Exciting the vibrating wire may increase an amplitude of the vibrating wire while maintaining the frequency and the phase of the vibrating wire. The system may further include a signal gate for controlling the relaying of the excitation signal from the signal generator to the excitation unit. The signal gate may relay the excitation signal intermittently but with enough recurrence to maintain a continual vibration of the wire.

In some embodiments, the excitation unit comprises of a coil. The coil may excite the vibrating wire using the excitation signal and detect vibrations of the wire. Furthermore, the signal gate may alternate between relaying the excitation signal to the coil from the excitation unit and relaying vibration detection signals, used to calculate the frequency of the wire, from the coil.

A system may also include a plurality of excitation systems as described above and a data controller connected to the signal gate of each of the excitation systems. The data controller may send time-synchronous excitation signals to each of the signals gates to control the transfer of the excitation signal to the excitation unit of each excitation system.

A method for increasing an amplitude of a vibrating wire is also disclosed. The method may include calculating a frequency of the wire and generating an excitation signal with a frequency that matches the frequency of the wire. The method may further include exciting the wire using the excitation signal to increase an amplitude of the wire and gating the excitation signal to prevent the excitation signal from exciting the wire except when a gating signal is received. In some embodiments, the method may further include calculating a phase of the wire so that the excitation signal is generated with a phase that matches the phase of the wire.

In some embodiments, exciting the wire may occur while the wire is vibrating and at any point during a cycle of the wire. Additionally, the wire may be excited for a predetermined number of cycles of the wire. What is more, the gating signal may be received intermittently to allow detection of movement of the wire between received gating signals but often enough to maintain a continual vibration of the wire.

After the amplitude of the vibrating wire is increased, the resonant frequency of the wire may be measured. The resonant frequency may be used for a variety of purposes. For instance, the gauge may be connected to a structural member and the resonant frequency can be used to measure or estimate a physical characteristic within the system such as strain, stress, load, deflection, fluid or air pressure, displacement, fluid level, angular rotation, fluid flow, precipitation, wind speed, rainfall, or snow-water-equivalent. In other configurations, the gauge may be stand alone, meaning that the gauge is not connected to any structural member, for instance in configurations where the gauge is measuring temperature or pressure.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Disclosed embodiments relate to vibrating wire gauges and to methods for exciting a wire while it is vibrating to allow for measurement of the resonant frequency of the vibrating wire.

As briefly described above, the disclosed embodiments may be suitable for use in connection with a vibratory wire gauge. More specifically, the disclosed embodiments may be useful in exciting a vibrating wire in a vibrating wire gauge. The vibrating wire may be excited, that is the amplitude of the vibrating wire may be increased, by using a signal that matches the frequency and phase of the vibrating wire. To excite the wire, the frequency of the wire may be measured and converted to digitized data. The digitized data may be converted into an accurate estimation of the vibrating wire's resonant frequency, phase, and amplitude. An excitation signal may be created that matches the frequency and phase of the vibrating wire. The excitation signal may be applied to the vibrating wire to increase the amplitude of the vibrating wire. Increasing the amplitude of the wire may allow for a more accurate estimation of the vibrating wire's resonant frequency. The increase in amplitude in the vibrating wire may be controlled by the amplitude of the excitation signal and the duration or number of cycles that the excitation signal is used to excite the vibrating wire. Furthermore, the excitation signal may be applied intermittently but with enough recurrence to maintain a continual vibration of the wire. Maintaining a continual vibration of the wire may decrease the period needed between consecutive measurements of the resonant frequency of the wire.

As previously mentioned, the resonant frequency of the vibrating wire may be used to calculate or estimate any number of physical characteristics, including but not limited to strain, stress, load, deflection, gas pressure, fluid pressure, displacement, fluid level, angular rotation, temperature, wind speed, fluid flow, precipitation, snow-water-equivalent and the like or any combination thereof.

Figure 1:
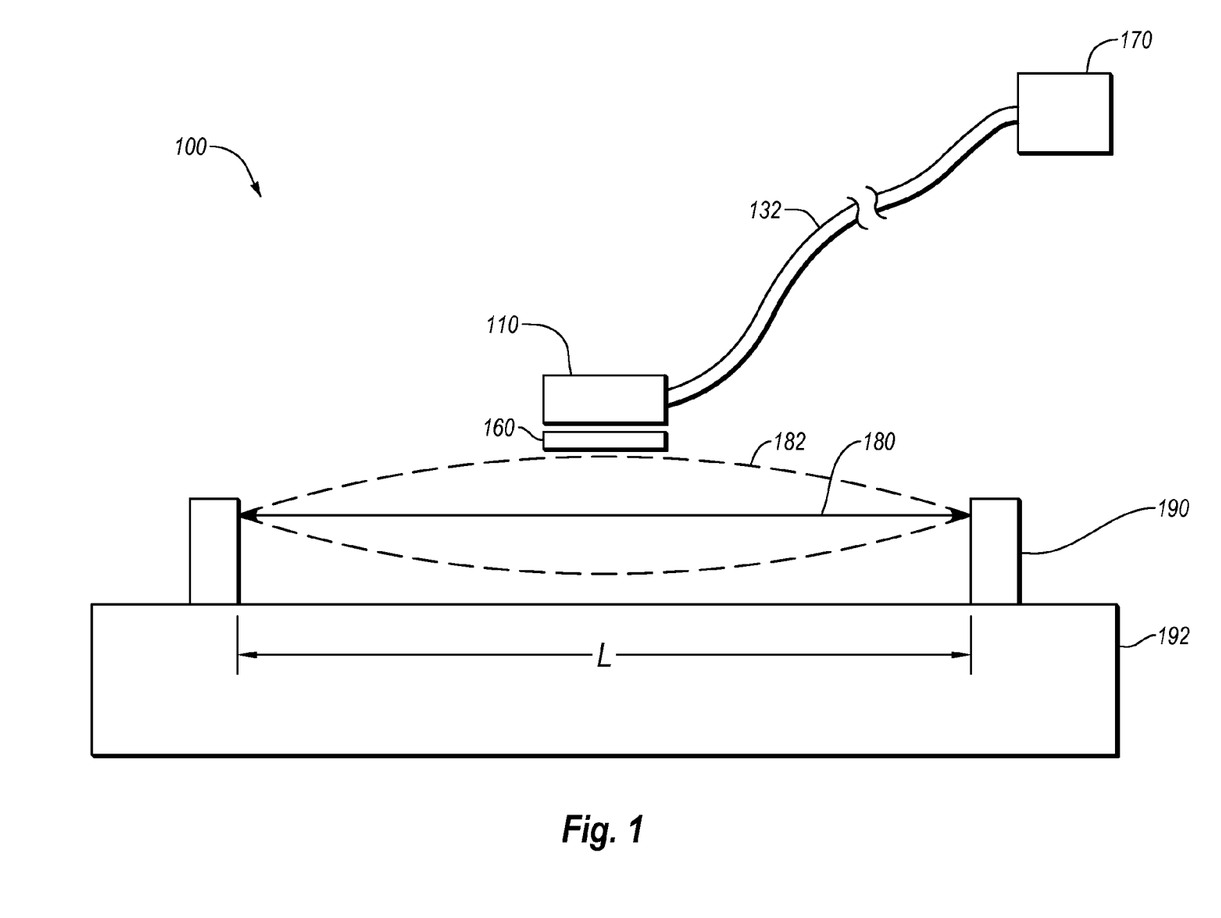
FIG. 1 illustrates a vibrating wire gauge system according to some embodiments.

FIG. 1 shows a schematic representation of one embodiment of a vibratory wire gauge suitable for use in connection with the present invention. One of skill in the art can appreciate, with the benefit of the present disclosure, the applicability of example embodiments to multiple variations of wire gauge sensors as well as to other types of sensors that generate data related to resonant frequencies. As discussed more specifically below, the method and system of the present invention may be used with any number of vibratory wire configurations.

For instance, the vibrating wire gauge may also be used in configurations where the gauge is not connected to any structural member. For example, a temperature gauge may calculate the temperature surrounding the gauge by measuring and calculating the different coefficients of thermal expansion of both the vibrating wire and the material holding the wire (both of which are considered a component of the "gauge" within the art). In another configuration, a vibrating wire may measure the pressure of a system without being attached to any structural member. In a pressure gauge configuration, the gauge includes a vibrating wire that is fixed on one end and is connected to a diaphragm on the other end. The gauge measures the pressure of the system as the diaphragm flexes in response to pressure changes. Thus, the vibrating wire gauge may be used in any number of configurations in association with the present invention, and is not limited to configurations where the gauge is attached to a structural member.

FIG. 1 illustrates a system for measuring a frequency of a wire in a vibrating wire gauge according to some embodiments. Specifically, FIG. 1 illustrates a system for measuring the frequency of a wire in a vibrating wire gauge that is attached to a structure to measure the strain on the structure. It should be understood that FIG. 1 is only one example of a vibrating wire gauge system and the described system may be used in any vibratory wire gauge configurations or other vibrating systems.

FIG. 1 illustrates a vibratory wire strain gauge 100 that includes a wire 180 tensioned between two securement means 190 that are attached to the concrete, rock, soil, or structural member 192 being measured. The strain gauge 100 further includes a wire controller 110 and a wire interface 160 that operate in combination to excite the wire 180 and measure the resonant frequency of the wire 180. Displacement of the wire 180 as it vibrates is illustrated by the dotted line 182. According to the vibrating wire principle, if the distance "L" between securement means 190 changes, whether by expansion, compression, or other reason, there will be a change in strain or tension on the wire 180. A change in the tension of the wire 180 results in a change in the resonant frequency of the wire 180.

As the frequency of the vibrating wire 180 is measured, a signal is transmitted via a cable 132 to a data acquisition unit, such as a data controller 170 that logs the measurements and provides a user interface to the wire controller 110. The data controller thus allows a user the ability to command the wire controller 110 to initiate and measure the vibration of wire 180.

As previously mentioned, the specific elements and configuration of the vibrating wire gauge 100 may be modified without deviating from the scope of the present disclosure. By way of example, one end of the vibrating wire may be attached to a diaphragm to measure pressure, or in another configuration, both ends of the vibrating wire may be attached to a material with a coefficient of expansion differing from the vibrating wire in a system designed to measure temperature. In each of these configurations, the vibrating wire is excited and its response is measured and transmitted in a manner similar to the configuration illustrated in FIG. 1.

Figure 2:
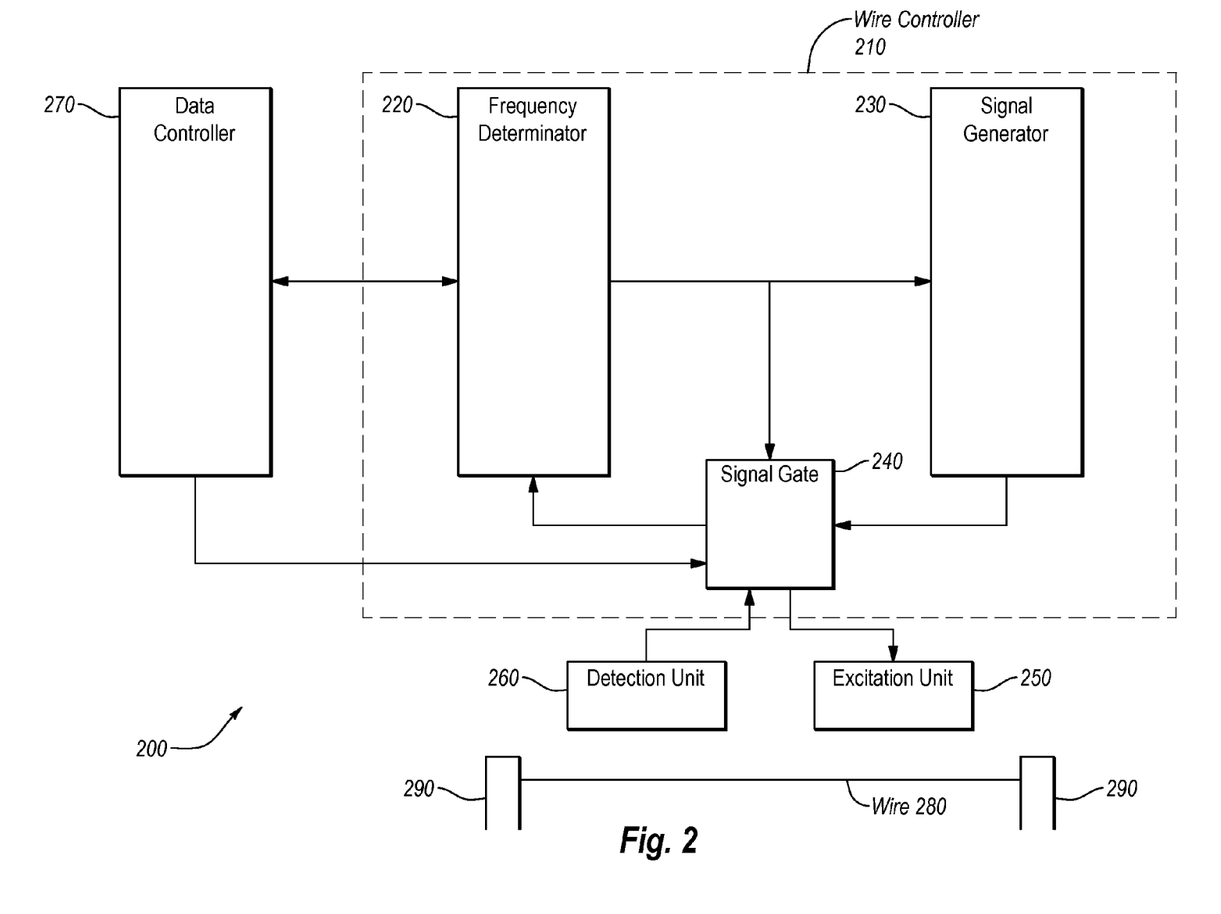
FIG. 2 illustrates various components of a vibrating wire gauge system according to some embodiments.

FIG. 2 illustrates a schematic diagram of various components in a wire gauge system 200 according to some embodiments. The system 200 includes a wire controller 210, excitation unit 250, detection unit 260, and a data controller 270. The wire controller 210 includes a frequency determinator 220, signal generator 230, and a signal gate 240. The frequency determinator 220 sends signals to and receives signals from the data controller 270 and the signal gate 240. The frequency determinator 220 also sends signals to the signal generator 230. The signal generator 230 sends signals to the signal gate 240. The signal gate 240 relays signals to the excitation unit 250 and receives signals from the detection unit 260 and the data controller 270.

In some embodiments, the wire controller 210 operates, under the direction of the data controller 270, to alternate between exciting a wire 280 tensioned between members 290 and measuring a frequency of the wire 280. In some embodiments, the data controller 270 may direct the wire controller 210 to operate continuously. In these embodiments, the wire controller 210 is exciting the wire 280, measuring the frequency of the wire 280, or both. In some embodiments, the wire controller 210 operates independently to excite the wire 280 and measure the frequency of the wire 280.

To measure the frequency of the wire 280, the detection unit 260 detects the motion of the wire 280 and sends motion signals to the signal gate 240. The signal gate 240 relays the motion signals to the frequency determinator 220. The frequency determinator 220 analyses the motion signals from the detection unit 260 and determines the frequency, phase, and the amplitude of the vibrating wire 280.

In some embodiments, the frequency of the vibrating wire 280 is then sent to the signal generator 230. Additionally or alternately, the phase of the vibrating wire 280 is sent to the signal generator 230. The signal generator 230 uses the frequency, the phase, or both the frequency and phase of the wire 280 to generate an excitation signal that matches the frequency, the phase, or both of the vibrating wire 280. The excitation signal is used to increase an amplitude of the resonant frequency of the vibrating wire 280 without altering the frequency or phase of the vibrating wire 280. Increasing the amplitude of the vibrating wire 280 may ensure that the wire 280 continues vibrating at its resonant frequency while the motion of the vibrating wire 280 is detected by the detection unit 260. Furthermore, increasing the amplitude of the vibrating wire 280 may also enable the detection unit 260 to more accurately detect movements of the wire 280, which may lead to more accurate measurements of the frequency of the wire 280.

If the frequency or phase of the excitation signal does not match the frequency and phase of the vibrating wire 280, the amplitude of the vibrating wire 280 may not be increased and, in some instances, the amplitude of the vibrating wire 280 may be dampened. Furthermore, if the signal generator 230 did not produce an excitation signal that matched the frequency and phase of the wire 280, the signal generator 230 would have to use a variety of signals at different frequencies, such as a frequency sweep, to increase the wire's 280 amplitude. Producing this sweep of excitation signals may take more time than exciting the wire 280 with the excitation signal that matches the frequency and phase of the wire 280.

Once the frequency of the wire 280 has been measured and used to generate an excitation signal, the excitation signal may be used to excite the wire 280 as directed by the data controller 270. In some embodiments, the signal generator 230 may output an excitation signal to the signal gate 240 as directed by the data controller 270 and the signal gate 240 may relay the excitation signal to the excitation unit 250 as directed by the data controller 270.

In some embodiments, the signal generator 230 outputs a continuous excitation signal to the signal gate 240. The signal gate 240, when receiving a continuous excitation signal from the signal generator 240, may only allow a predetermined number of cycles of the excitation signal to be relayed to the excitation unit 250. For example, the signal gate 240 may pass 0, 0.5, 1, 1.5, 2, or any other fraction or number of cycles of the excitation signal to the excitation unit 250. In some embodiments, the number of cycles of the excitation signal relayed to the excitation unit 250 may control the increase in amplitude of the vibrating wire 280. In some embodiments, a single cycle, a fraction of a single cycle, or none of the excitation signal may be passed to the excitation unit 250 to reduce the risk of increasing the amplitude of the vibrating wire 280 to such a degree that the vibrating wire 280 is damaged.

To relay only a predetermined number of cycles or fraction of cycles of the excitation signal to the excitation unit 250, the signal gate 240 relies on the frequency information of the vibrating wire 280 output by the frequency determinator 220. With this information, the signal gate 240 may start relaying the excitation signal at any point during the cycle of the excitation signal and still relay only the predetermined number of cycles or fraction of cycles of the excitation signal because the signal gate 240 knows the exact period of the excitation signal. The ability to relay the excitation signal at any point during the cycle of the excitation signal allows the signal gate 240 to be controlled by an external source, such as the data controller 270, that is not synchronized to the excitation signal.

In some embodiments, the data controller 270 may control how much the vibrating wire 280 is excited by controlling the amplitude of the excitation signal and the number of cycles that the excitation signal is applied to the excitation unit 250. In some embodiments, the wire controller 210 may control how much the vibrating wire 280 is excited by controlling the amplitude of the excitation signal and the number of cycles that the excitation signal is applied to the excitation unit 250. In either case, the wire controller 210 or the data controller 270 may determine the amount to excite the wire 280 based on the current amplitude of the vibrating wire 280 as determined by the frequency determinator 220.

In some embodiments, while the signal gate 240 is relaying the excitation signal to the excitation unit 250, the signal gate 240 is blocking signals from the detection unit 260. In some embodiments, the detection unit 260 and the excitation unit 250 may be the same unit and require the use of the signal gate 240 to mediate between relaying motion data signals from the combined unit and relaying excitation signals to the combined unit.

After exciting the wire 280 by relaying the excitation signals to the excitation unit 250, the wire controller 210 begins again to measure the frequency of the vibrating wire 280. To measure the frequency of the vibrating wire 280 as previously described, the signal gate 240 blocks the excitation signal and relays the motion signal from the detection unit 260 to the frequency determinator 220 to allow the frequency of the vibrating wire 280 to be determined. The wire controller 210 continues to measure the frequency of the wire 280 until the data controller 270 sends a signal again to excite the wire 280.

In some embodiments, when the wire controller 210 receives the signal to excite the wire 280, the wire 280 may not be vibrating. In this case, the excitation signal output by the signal generator 230 does not have the resonant frequency of the wire 280 because the resonant frequency of the wire has not yet been determined. To cause the wire to vibrate, the signal generator 230 sends an excitation signal with multiple frequency components, as described hereafter, to the signal gate 240. The signal gate 240 relays the excitation signal to the excitation unit 250. The excitation unit 250 uses the excitation signal to excite or pluck the wire 280, causing the wire 280 to vibrate at the wire's 280 resonant frequency.

The data controller 270 may also send a determination signal to the wire controller 210 to have the wire controller 210 send the frequency of the wire 280 to the data controller 270. In some embodiments, after receiving the determination signal, the frequency determinator 220 may use previously collected motion data from the detection unit 260 to determine the frequency of the vibrating wire 280. The determined frequency is then sent to the data controller 270. In some embodiments, after receiving the determination signal, the frequency determinator 220 may collect motion data from the detection unit 260 to determine the frequency of the vibrating wire 280. The determined frequency is then sent to the data controller 270. In some embodiments, before determining the frequency of the wire 280, the wire 280 may be further excited to increase the amplitude of the vibrating wire 280.

As illustrated and described, the data controller 270 may control the operation of the wire controller 210. The wire controller 210 may send the frequency of the vibrating wire 280 based on a signal from the data controller 270. The wire controller 210 may also control when the vibrating wire 280 is further excited based on a signal from the data controller 270. The data controller 270 may send the signal to excite the vibrating wire 280 with enough recurrence to maintain a continual vibration of the wire 280. In some embodiments, the wire controller 210 operates independently to excite the wire 280 and measure the frequency of the wire 280.

In some embodiments, the data controller 270 interface may be configured to interface with a user. For example, the data controller 270 may be a computer that receives information regarding when to determine the frequency of the wire 280 and relays that information to a user. In another example, the data controller 270 may be a computer or some other device that is programmed to obtain measurements at certain intervals or under certain conditions, such as when a signal is received, at certain times, or based on some other condition. In some embodiments, the data controller 270 may be coupled with the frequency determinator 220 by way of a wire, a network, such as a 802.11 network, Bluetooth network, or using some other connection.

Figure 3:
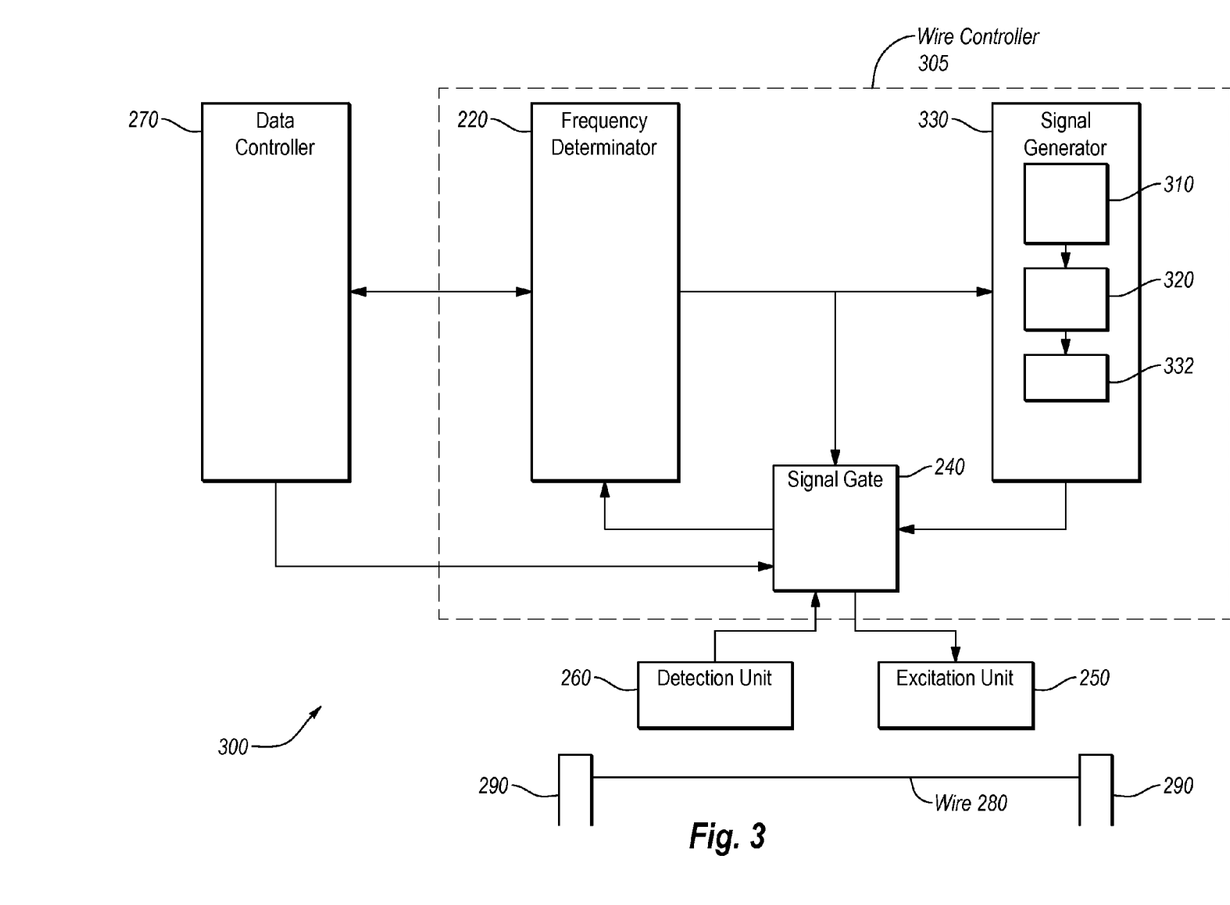
FIG. 3 illustrates various components of a vibrating wire gauge system according to some embodiments.

FIG. 3 illustrates a schematic diagram of various components in a wire gauge system 300 according to some embodiments. The system 300 includes a wire controller 305 that is coupled to the data controller 270. The wire controller 305 includes the various components included in the wire controller 210 of FIG. 2, except a signal generator 330 is different from the signal generator 230 of FIG. 2. The signal generator 330 may include a mirrored oscillator 310, that is an oscillator that "mirrors" the vibration of the wire 280, a digital to analog converter (DAC) 320, and an amplifier 332. The mirrored oscillator 310 may receive a frequency indicator signal from the frequency determinator 220. The indicator signal is used by the mirrored oscillator 310 to generate a digital signal representing an amplitude that is sent to the DAC 320. The DAC 320 converts the digital amplitude to an analog amplitude. The mirrored oscillator 310 varies the digital signal based on the indicator signal. As a result, the DAC 320 outputs a discrete sinusoidal signal that matches the frequency and phase of the vibrating wire 280. The sinusoidal signal passes through the amplifier 332 that amplifies the sinusoidal signal and acts as a low pass filter to reduce any unwanted high frequencies components resulting from the digital to analog conversion. The amplifier 332 passes the sinusoidal signal to the signal gate 240.

As explained above, when the wire 280 is not vibrating the signal generator 330 generates an excitation signal that excites the wire 280. However, when the wire 280 is not vibrating the signal generator 330 is unable to produce an excitation signal that matches the resonant frequency of the wire 280. To excite the wire 280, the signal generator 330 may generate any excitation signal. Because the excitation signal is a discretely generated sinusoidal signal that is finite in duration, the spectra of the excitation signal may have enough tones to excite the wire 280 sufficiently to cause resonant motion of the wire 280, allowing the detection unit 260 to measure the wire's 280 movement and thereby determine or approximate the frequency of the wire 280. In some embodiments, to excite the wire 280 initially the signal generator 330 may generate an excitation signal that matches the frequency of the last excitation signal generated by the signal generator 330. In some embodiments, a predetermined excitation signal may be used initially to excite the wire 280, which may include but is not limited to a frequency sweep.

In some embodiments, the amplifier 332 may be an adjustable gain amplifier. The gain of the amplifier may be adjusted to a higher gain when exciting a wire 280 that is not vibrating so that the excitation signal has enough energy at the resonant frequency of the wire 280 to excite the wire 280 sufficiently to allow the motion of the wire 280 to be detected. After the wire 280 is vibrating, in some embodiments, the gain of the amplifier 332 may be adjusted according to how much the excitation signal should excite the vibrating wire 280. Furthermore, in some embodiments, adjusting the gain may be necessary because the main frequency of the sinusoidal excitation signal is the resonant frequency and a high-amplitude excitation signal may transfer to much energy to the wire 280 thereby causing the wire 280 to vibrate excessively and be damaged.

In some embodiments, the components in the signal generator 330 may be formed from discrete parts. In some embodiments, the components in the signal generator 330 may be formed from a single part or some combination of parts. For example, the mirrored oscillator 310 may be formed in a field programmable gate array (FPGA), an application specific integrated circuit (ASIC), a processor, or some other device. The DAC 320 and amplifier 332 may both be or only one may be standalone components, integrated into an FPGA or ASIC, integrated into an FGPA and ASIC with the mirrored oscillator 310, or otherwise configured. Furthermore, in some embodiments, the mirrored oscillator 310 and the DAC 320 may be combined in a single device. It should be further understood that the components of the signal generator 330 may be formed from analog parts such as a voltage-controlled oscillator and an amplifier.

Figure 4:
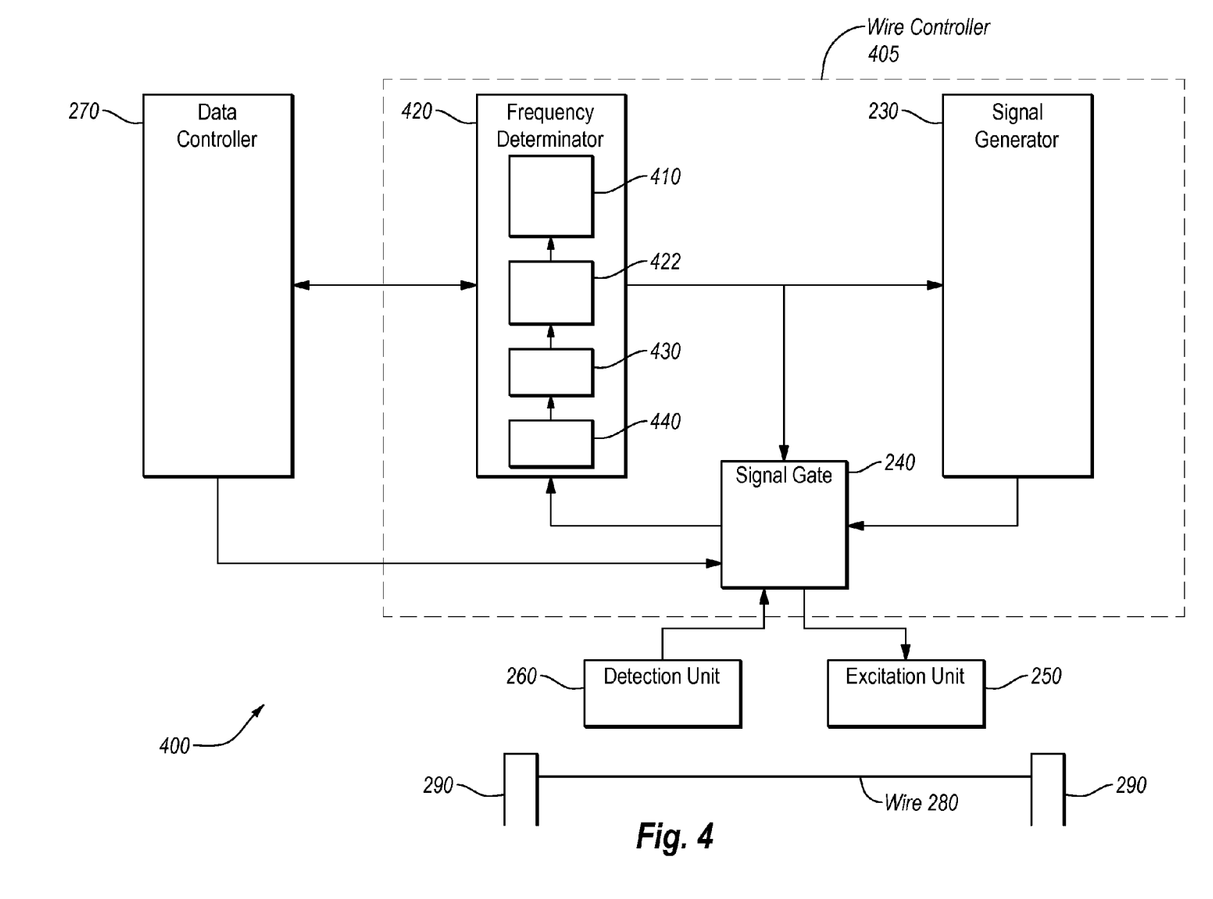
FIG. 4 illustrates various components of a vibrating wire gauge system according to some embodiments.

FIG. 4 illustrates a schematic diagram of various components in a wire gauge system 400 according to some embodiments. The system 400 includes a wire controller 405 that is coupled to the data controller 270. The wire controller 405 includes the various components included in the wire controller 210 of FIG. 2, except a frequency determinator 420 in wire controller 405 is different from the frequency determinator 220 of FIG. 2. The frequency determinator 420 may include a processor 410, an analog to digital converter (ADC) 422, an amplifier 430, and a current to voltage converter 440.

The current to voltage converter 440 receives a motion data signal that is a current from the signal gate 240 and converts the motion data signal to a voltage. The converter 440 may use a resistor network or some other apparatus to convert the current to voltage. The voltage motion data signal is amplified by the amplifier 430, converted to a digital signal by the ADC 422, and sent to the processor 410. The processor 410 samples the digital motion data signal and analyzes the digital motion data signal to determine the frequency of the wire 280. The processor 410 may sample and store multiple digital motion data signals from one or more cycles of the wire 280 before analyzing the digital motion data signals to determine the frequency of the wire 280.

For example, the one or more data signals may be analyzed by transforming the digital motion data signal from the time domain to the frequency spectrum. According to one embodiment, the transformation is done using a Fourier transform, and more specifically using a Fast Fourier Transform. The frequency spectrum may be used to determine the resonant frequency of the vibrating wire. According to one embodiment, an interpolation is used, and more specifically, the interpolation method may be a spectral interpolation method. In other words, the interpolation may be used to determine the resonant frequency of the excited wire, which may then be used to calculate various properties of the structural member.

Advantageously, this method can distinguish signal from noise based on frequency content. A noise source that is at a sufficiently different frequency, for example, may approach the same amplitude as the wire resonance before it impacts the measurement of the resonance frequency. Because noise often does not approach the same amplitude, the noise can be distinguished from the resonance signal based on frequency content. This example of wire spectrum analysis advantageously provides improved rejection of external noise sources that would otherwise impact the resonance measurements and improves the precision of the measurement. A more detailed explanation of how to determine the frequency using interpolation is described in U.S. Pat. No. 7,779,690, which is incorporated by reference herein in its entirety.

In some embodiments, the components in the frequency determinator 420 may be formed from discrete parts. In some embodiments, the components in the frequency determinator 420 may be formed from a single part or some combination of parts. For example, the processor 410 may be a stand-alone microprocessor or a microprocessor formed in an FPGA or an ASIC. The ADC 422 and amplifier 430 may both be or only one may be stand-alone components, integrated into an FPGA or ASIC, integrated into an FGPA and ASIC with the processor 410, or otherwise configured. Furthermore, in some embodiments, the frequency determinator 420 may be integrated into an FPGA or ASIC together with the signal generator 230.

Figure 5:
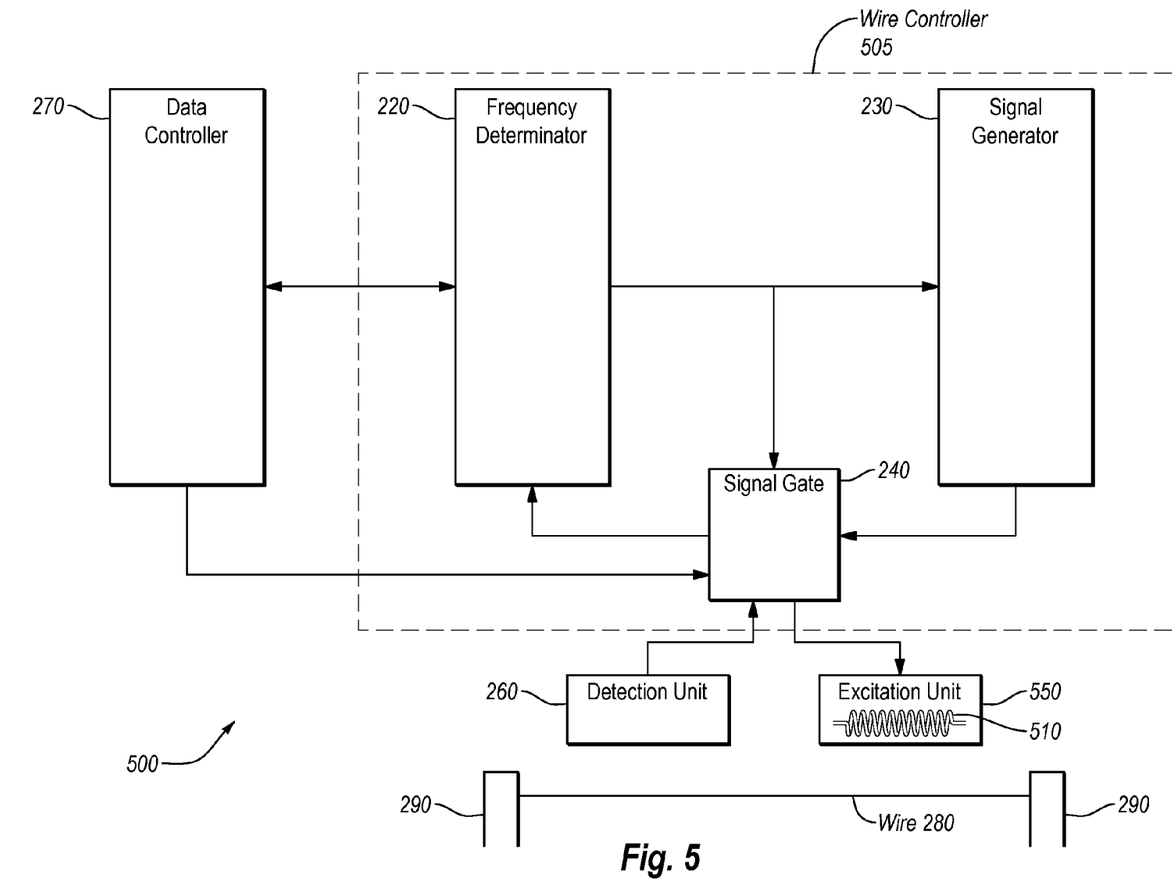
FIG. 5 illustrates various components of a vibrating wire gauge system according to some embodiments.

FIG. 5 illustrates a schematic diagram of various components in a wire gauge system 500 according to some embodiments. The system 500 includes a wire controller 505 that is coupled to the data controller 270. The wire controller 505 includes the various components included in the wire controller 210 of FIG. 2. An excitation unit 550 in the system 500 is different from the excitation unit 250 of FIG. 2. The excitation unit 550 may include a coil 510. As the excitation signal travels through the coil 510 an electromagnetic field is generated. Depending on the direction of the field, the field pushes or pulls the wire 280 causing the wire 280 to vibrate. If the excitation signal has a frequency equal to the resonant frequency of the wire 280, the electromagnetic field is pulsed at the same frequency as the wire 280. As a result, the excitation electromagnetic field increases the amplitude of the wire 280 at the wire's 280 resonant frequency without changing or altering the frequency of the wire 280. If the electromagnetic pulse was not the same frequency as the wire 280, the pulse may dampen or stop the vibration of the wire. Furthermore, if the pulse was out of phase with the wire 280, the pulse may dampen or stop of the wire 280. In either case, the amplitude of the wire 280 may not be increased but decreased. It should be understood that various other components may be used to excite the wire 280.

Figure 6:
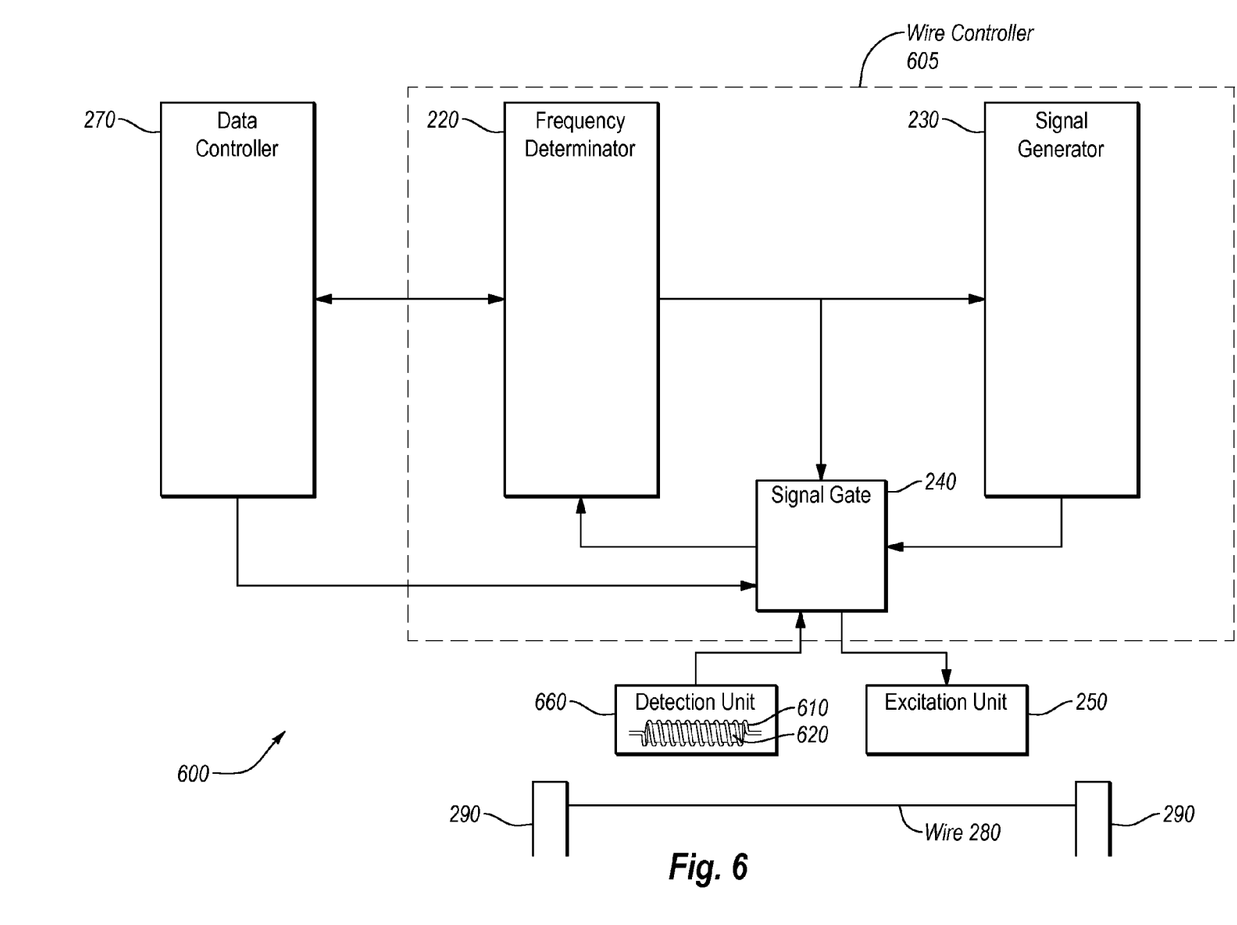
FIG. 6 illustrates various components of a vibrating wire gauge system according to some embodiments.

FIG. 6 illustrates a schematic diagram of various components in a wire gauge system 600 according to some embodiments. The system 600 includes a wire controller 605 that is coupled to the data controller 270. The wire controller 605 includes the various components included in the wire controller 210 of FIG. 2. A detection unit 660 in the system 600 is different from the detection unit 260 of FIG. 2. The detection unit 660 may include a coil 610 surrounding a magnet 620. As the wire 280 vibrates and swings toward and away from the magnet 620, the magnetic field around the magnet 620 is changed. The change in the magnetic field induces a current in the coil 610 that is then sent as the motion data signal to the frequency determinator 220. It should be understood that various other components may be used to detect motion of the wire 280. Furthermore, in some embodiments, the excitation unit 550 of FIG. 5 and the detection unit 660 may be combined. In these embodiments, the coil 610 of the detection unit 260 may be the same coil 510 in the excitation unit 550 as illustrated in FIG. 5.

Figure 7:
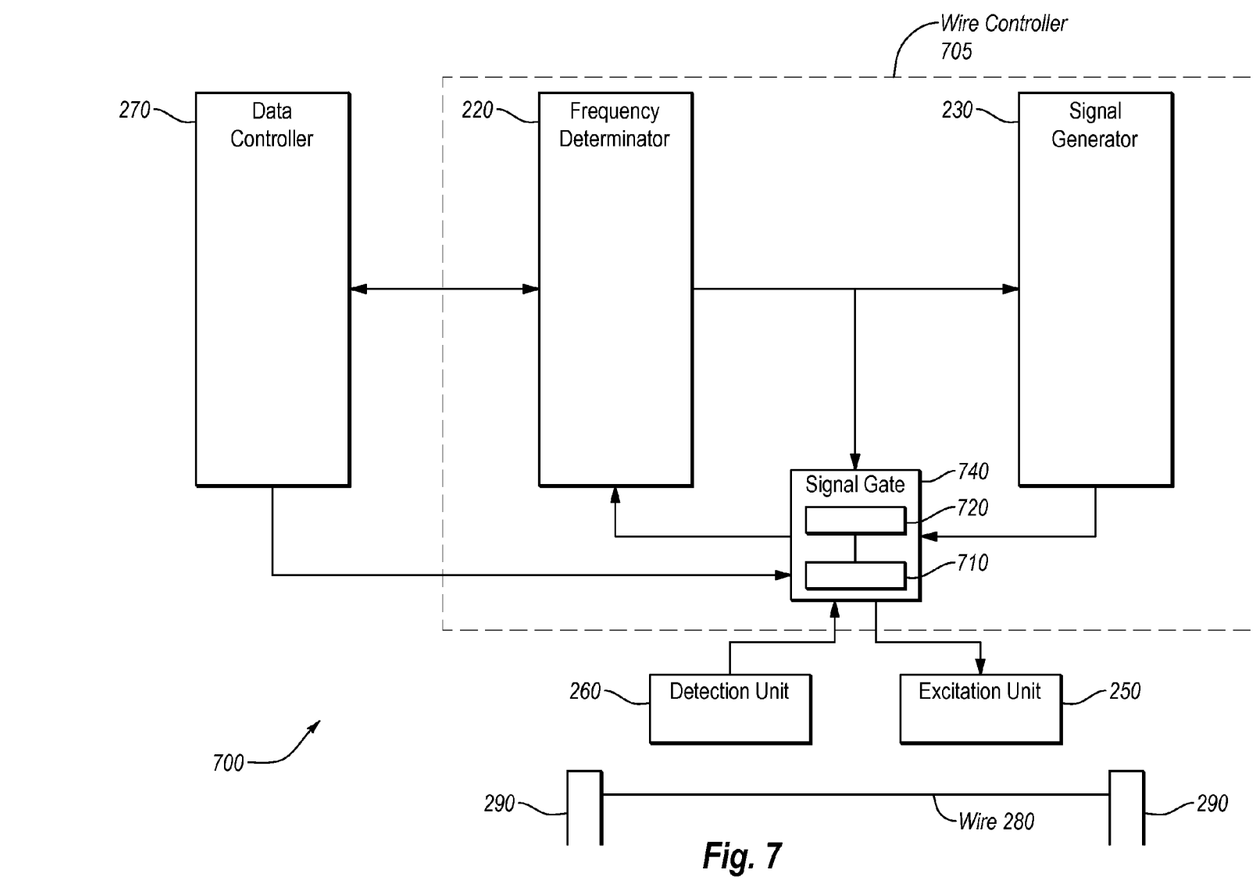
FIG. 7 illustrates various components of a vibrating wire gauge system according to some embodiments.

FIG. 7 illustrates a schematic diagram of various components in a wire gauge system 700 according to some embodiments. The system 700 includes a wire controller 705 that is coupled to the data controller 270. The wire controller 705 includes the various components included in the wire controller 210 of FIG. 2, except a signal gate 740 in wire controller 705 is different from the signal gate 240 of FIG. 2. The signal gate 740 may include a signal router 710, such as a multiplexer, and a logic block 720. The logic block 720 is coupled to the signal router 710 and controls when the signal router 710 relays the excitation signal to the excitation unit 250 and the motion data signal to the frequency determinator 220. The logic block 720 may receive signals from the data controller 270 and, based on these signals, direct the signal router 710 to relay the motion data signal, the excitation signal, or both. Implementing the logic block 720 allows the data controller 270 to operate at a different frequency than portions of the wire controller 305.

The logic block 720 also directs the signal router 710 to control how many cycles of the excitation signal are relayed. To control the number of cycles that are relayed, the logic block 720 receives a frequency indicator signal from the frequency determinator 220, the same frequency indicator signal that is sent to the signal generator 230. The logic block 720 uses the frequency indicator signal to determine the frequency of the excitation signal produced by the signal generator 230. Knowing the frequency of the excitation signal, the logic block 720 can direct the signal router 710 to relay the excitation signal for the predetermined number of cycles. Furthermore, the logic block 720 may allow the excitation signal to start to be relayed during any point of the cycle of the excitation signal, and therefore any point during the vibration of the wire 280, and still only allow the predetermined number of cycles to be relayed.

In some embodiments where the excitation unit 250 and the detection unit 260 are the same unit, the signal router 710 serves as a multiplexer to control whether the excitation signal or motion data signal is relayed. For example, the signal router 710 connects the signal generator 230 with the combined excitation and detection unit when the excitation signal is relayed while disconnecting the frequency determinator 220 from the combined excitation and detection unit. When the motion data signal is relayed, the signal router 710 connects the frequency determinator 220 with the combined excitation detection unit while disconnecting the signal generator 230 from the combined excitation and detection unit. Additionally, the signal router 710 may disconnect the combined excitation and detection unit from both the signal generator 230 and the frequency determinator 220.

In some embodiments, the components in the signal gate 740 may be formed from discrete parts. In some embodiments, the components in the signal gate 740 may be formed from a single part. For example, the logic block 720 may be formed in an FPGA or an ASIC. The signal router 710 may be a standalone component, integrated into an FPGA or ASIC, integrated into an FGPA and ASIC with the processor logic block 720, or otherwise configured. Furthermore, in some embodiments, the signal gate 740 may be integrated into an FPGA or ASIC with the signal generator 230, the frequency determinator 220, or both.

Figure 8:
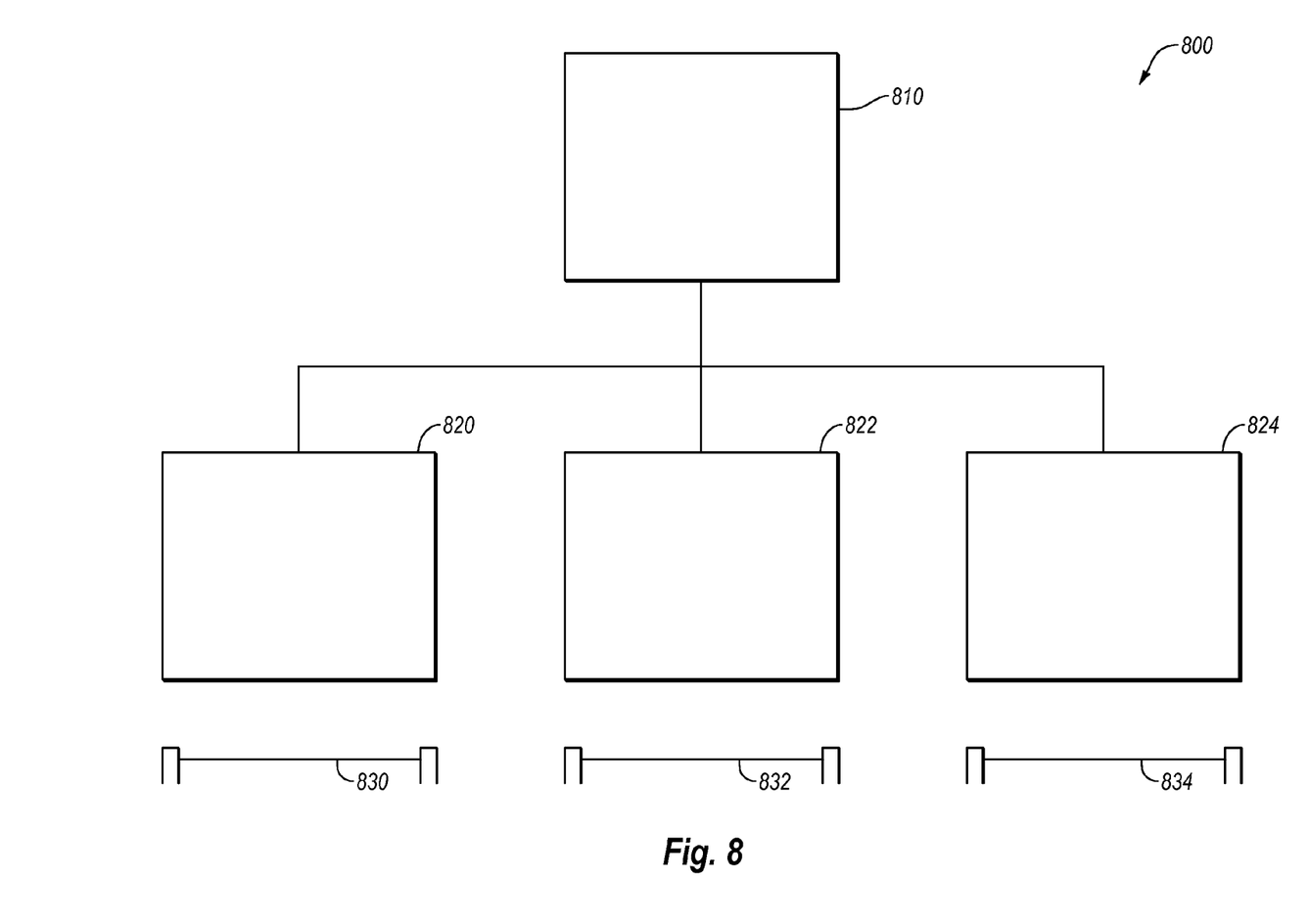
FIG. 8 illustrates multiple vibrating wire gauge systems controlled by a single data controller according to some embodiments.

FIG. 8 illustrates a system 800 that contains a plurality of wire controllers controlled by a single data controller according to some embodiments. The system 800 includes a data controller 810 connected to first, second, and third wire controllers 820, 822, 824. Each of the wire controllers 820, 822, 824 is similar to the wire controller 210 illustrated in FIG. 2 and each has a signal gate similar to signal gate 240 illustrated in FIG. 2. Thus, excitation signals produced by each wire controller 820, 822, 824 may be used to excite each wire controller's 820, 822, 824 respective vibrating wire 830, 832, 834 at the same time based on a signal from the data controller 810. Furthermore, with a signal gate, motion data signals may be obtained by each wire controller 820, 822, 824 at the same time based on a signal from the data controller 810. As a result, time-synchronous excitation and time-synchronous measurement of the vibrating wires 830, 832, 834 may be performed by the wire controllers 820, 822, 824 based on a signal from the data controller 810.

Figure 9:
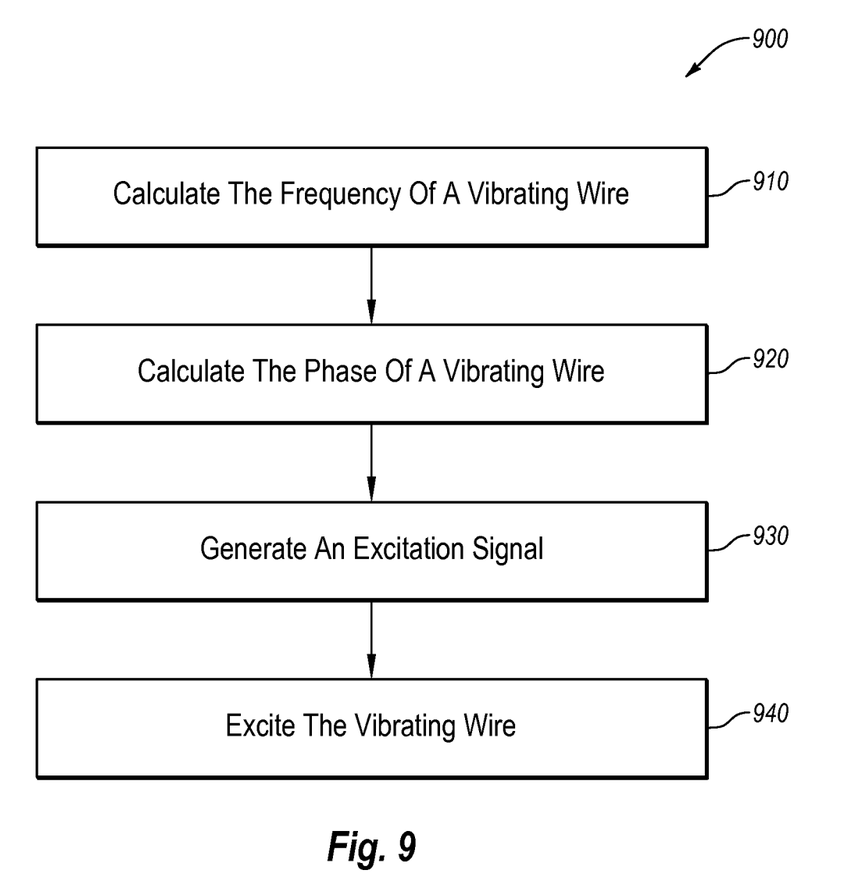
FIG. 9 illustrates a method of vibrating a wire in a vibrating wire gauge system according to some embodiments.

FIG. 9 illustrates a method 900 for increasing the amplitude of a vibrating wire according to some embodiments. The method 900 allows for the continuous vibration of the wire by intermittently increasing the amplitude of or exciting the wire. Between the intermittent excitations, the movement of the vibrating wire may be detected and the frequency of the vibrating wire calculated. By using an intermittent excitation, a combined excitation and detection unit may be utilized.

The method 900 may include calculating 910 the frequency of the vibrating wire and calculating 920 the phase of the vibrating wire. After the frequency and phase of the vibrating wire are calculated, an excitation signal, which may be a sinusoidal signal in some embodiments, with a frequency and phase that matches the frequency and phase of the vibrating wire is generated 930. The vibrating wire is then excited 940 while the wire is vibrating at any point during a cycle of the vibrating wire using the excitation signal to increase the amplitude of the vibrating wire.

To control the size of the response of the vibrating wire, that is the amplitude of the vibrating wire, the vibrating wire may only be excited for a predetermined number of cycles of the excitation signal by gating the excitation signal. For example, in some embodiments, the vibrating wire may be excited for 0, 0.5, 1, 1.5, 2, or 3 cycles of the excitation signal. Additionally or alternately, the amplitude of the excitation signal may be adjusted based on the desired amplitude of the vibrating wire. Furthermore, because the frequency and phase of the signal match the vibrating wire, the frequency of the vibrating wire does not change.

By gating the excitation signal, a data controller that is not synchronized with the excitation signal may control when the vibrating wire is excited. This allows for time-synchronous excitation of multiple vibrating wire gauges. Furthermore, in some embodiments, the motion data signals may be gated and controlled by a data controller that is not synchronized with the vibrating wire. This allows for time-synchronous measurement of multiple vibrating wire gauges.

It should be understood that the above-described functionality may be implemented with digital components, analog components, or a mix thereof. Furthermore, various embodiments have been described with respect to vibrating wire gauges. The principles described herein may be applied to other resonant structures, such as quartz microbalances. Thus, the disclosed invention may be embodied in other specific forms without departing from its spirit or essential characteristics. Furthermore, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for measuring a frequency of a wire in a vibrating wire gauge, the system comprising:
   a signal generator for generating a signal at a frequency that matches a frequency of the wire;
   an excitation unit for exciting the wire to increase an amplitude of the wire, the excitation unit exciting the wire using the signal; and
   a signal gate for controlling when the signal is sent to the excitation unit,
   wherein the signal gate sends the signal intermittently to the excitation unit but with enough recurrence to maintain a continual vibration of the wire.

2. The system of claim 1, wherein the signal is generated with a phase that matches the phase of the wire.

3. The system of claim 2, further comprising a frequency determinator for determining the frequency and the phase of the wire.

4. The system of claim 1, further comprising a data controller for receiving and storing the frequency of the wire from the frequency determinator and directing the signal gate to send the signal to the excitation unit.

5. The system of claim 1, wherein the signal generator controls the amplitude of the signal and thereby controls the amplitude of the wire.

6. The system of claim 1, wherein the signal gate sends the signal to the excitation unit at any point during a cycle of the signal.

7. The system of claim 1, wherein the signal gate controls the number of cycles of the signal sent to the excitation unit and thereby controls the amplitude of the wire.

8. The system of claim 1, further comprising a detection unit for detecting movement of the wire and sending detector signals to the frequency determinator.

9. The system of claim 8, wherein the signal gate alternates between sending the detector signals to the frequency determinator and sending the signal to the excitation unit.

10. The system of claim 9, wherein the detection unit and the excitation unit both comprise of a coil, wherein the detection unit coil and the excitation unit coil are the same coil.

11. An excitation system for exciting a vibrating wire in a vibrating wire gauge, the system comprising:
 a signal generator for generating an excitation signal that matches a frequency and a phase of the vibrating wire;
 an excitation unit for exciting the vibrating wire while the wire is vibrating at any point during a cycle of the vibrating wire, the excitation unit exciting the vibrating wire using the excitation signal, wherein exciting the vibrating wire increases an amplitude of the vibrating wire while maintaining the frequency and the phase of the vibrating wire; and
 a signal gate for controlling the relaying of the excitation signal from the signal generator to the excitation unit, wherein the signal gate relays the excitation signal intermittently but with enough recurrence to maintain a continual vibration of the wire.

12. The system of claim 11, wherein the excitation unit comprises of a coil, wherein the coil excites the vibrating wire using the excitation signal and detects vibrations of the wire.

13. The system of claim 12, wherein the signal gate alternates between relaying the excitation signal to the coil from the excitation unit and relaying vibration detection signals from the coil, wherein the vibration detection signals are used to calculate the frequency of the wire.

14. A system for controlling the vibration of multiple vibrating wire gauges, the system comprising:
 a plurality of excitation systems as recited in claim 11; and
 a data controller connected to the signal gate of each of the plurality of excitation systems, wherein the data controller sends time-synchronous excitation signals to each of the signals gates to control the transfer of the excitation signal to the excitation unit of each excitation system.

15. In a system including a vibrating wire gauge, a method for increasing an amplitude of a vibrating wire, the method comprising:
 calculating a frequency of the wire;
 generating an excitation signal with a frequency that matches the frequency of the wire;
 exciting the wire using the excitation signal to increase an amplitude of the wire; and
 gating the excitation signal to prevent the excitation signal from exciting the wire except when a gating signal is received.

16. The method of claim 15, further comprising calculating a phase of the wire, wherein the excitation signal is generated with a phase that matches the phase of the wire.

17. The method of claim 15, wherein exciting the wire occurs while the wire is vibrating.

18. The method of claim 17, wherein exciting the wire occurs at any point during a cycle of the wire.

19. The method of claim 18, wherein the wire is excited for a predetermined number of cycles of the wire after the gating signal is received.

20. The method of claim 19, wherein the gating signal is received intermittently to allow detection of movement of the wire between received gating signals.

21. The method of claim 20, wherein the gating signal is received often enough to maintain a continual vibration of the wire.

* * * * *